United States Patent
Kao et al.

(10) Patent No.: US 6,731,391 B1
(45) Date of Patent: May 4, 2004

(54) SHADOW MOIRE SURFACE MEASUREMENT USING TALBOT EFFECT

(75) Inventors: Imin Kao, Stony Brook, NY (US); Fu-Pen Chiang, Stony Brook, NY (US)

(73) Assignee: The Research Foundation of State University of New York, Stony Brook, NY (US)

(*) Notice: Subject to any disclaimer, the term of this patent is extended or adjusted under 35 U.S.C. 154(b) by 0 days.

(21) Appl. No.: 09/674,822
(22) PCT Filed: May 13, 1998
(86) PCT No.: PCT/US98/09710
§ 371 (c)(1), (2), (4) Date: Jan. 29, 2001
(87) PCT Pub. No.: WO99/58952
PCT Pub. Date: Nov. 18, 1999

(51) Int. Cl.⁷ .............................................. G01B 11/24
(52) U.S. Cl. ................... 356/605; 250/237 G
(58) Field of Search ............... 356/605, 237.2; 250/237 G (56) References Cited

U.S. PATENT DOCUMENTS

| 3,858,981 | A | * | 1/1975 | Jaerisch et al. ............. 356/512 |
| 4,972,075 | A | * | 11/1990 | Hamada et al. ........... 250/201.5 |
| 4,979,827 | A | | 12/1990 | Matsui |
| 5,062,094 | A | | 10/1991 | Hamada et al. |
| 5,311,286 | A | * | 5/1994 | Pike ............................ 356/605 |

* cited by examiner

Primary Examiner—Richard A. Rosenberger
(74) Attorney, Agent, or Firm—Baker Botts L.L.P.

(57) ABSTRACT

A method and apparatus for surface measurement using the shadow moire effect with the Talbot effect. The apparatus includes a specimen mount to receive a specimen having a surface to be measured, and a reference grating mounted adjacent to the specimen mount so as to be substantially parallel to a mean surface plane of the specimen. The reference grating is mounted in such a manner that the distance between the reference grating and the mean surface plane of the specimen can be adjusted to a Talbot distance $\delta T$. The apparatus also includes a light source to illuminate the specimen through the grating and a detector positioned to detect the moire fringes produced by the grating due to variation of the surface of the specimen.

24 Claims, 8 Drawing Sheets

SHADOW MOIRE SURFACE MEASUREMENT USING TALBOT EFFECT

STATEMENT OF GOVERNMENT RIGHTS

This invention was made with government support under National Science Foundation Contract #DID-9634889. The government may have certain rights in the invention.

BACKGROUND OF INVENTION

1. Field of the Invention

The present invention relates to surface measurement, and more particularly relates to surface measurement using a shadow moire technique with the Talbot effect.

2. Brief Description of the Prior Art

Surface measurement is required in the field of electronic device fabrication including, for example, fabrication of semiconductor devices. At the present time, wafers for fabricating such devices are slice either by an inner diameter saw or a wiresaw, followed by a series of lapping and polishing processes. A measuring device is necessary for measuring the flatness of the surface of the wafers after each manufacturing step. At the present time, such measurements are typically performed using a pair of capacitive probes to sample points on the surface of a rotating wafer.

In the method currently practiced, wafers are handled with a vacuum gripper to hold the wafer at the center and to spin it at high speed while the traversing capacitive probes are used to measure the thickness and surface properties of the wafers. There are a number of disadvantages associated with the current method. In order to obtain accurate measurements, numerous sampling points on the surface are needed, thus increasing the time required for inspection of wafers during production. Further, current techniques may distort the wafer which is being measured during the measurement process. Such distortions are introduced by the stress applied by the vacuum gripper, and also due to dynamic stresses caused by the high angular velocities used when spinning the wafer in order to traverse the capacitive probes.

In view of the foregoing deficiencies with current surface measurement techniques for electronic wafers, it would be desirable to develop an apparatus and method for surface measurement which can rapidly and accurately measure the surface characteristics of an entire wafer at once, without the need for multiple sampling points. Furthermore, it would be desirable if the measurement process did not introduce errors due to vacuum gripping or rotation Yet further, it would be desirable if the process could be automated, using, for example, a computer.

SUMMARY OF THE INVENTION

The present invention, which addresses the shortcomings of current systems, provides a method for surface measurement. The method includes the step of providing a specimen having a surface to be measured. A mean surface plane can be defined for the surface. The method further includes the step of supporting a reference diffraction grating at a distance $\delta_T$ from the mean surface plane of the specimen and substantially parallel to the mean surface plane. The distance $\delta_T$ is referred to as the Talbot distance. The reference diffraction grating has a characteristic pitch.

Further steps in the method include causing a beam of light to be directed through the reference grating onto the surface to be measured and then detecting moire fringes produced by the reference grating and the shadow of the reference grating on the surface (which forms an effective specimen grating) when there are irregularities on the specimen surface. In the step of causing the beam of light to be directed through the reference grating, the beam of light, which has a wavelength $\lambda$, casts a reference grating shadow onto the surface which is to be measured. The reference grating shadow forms the effective specimen grating. In the step of detecting the moire fringes, the moire fringes produced by the reference grating and the effective specimen grating can be used to compute the variation in depth of the surface to be measured and are indicative of a condition of the surface to be measured. The orders of the fringes are implicitly detected with the fringes themselves.

The specimen which is to be measured would most typically be a substrate wafer used in microelectronic fabrication, such as for silicon or other semiconductor devices. The beam of light which is provided can be a coherent beam of light, such as that from a laser beam, and the detection of the moire fringes can be accomplished with a camera or video capturing device. The method can be automated by, for example, digitizing the position and order of the moire fringes and entering the position and order into a computer which then calculates the surface depth and compensates for any misalignment between the reference grating and the specimen. The spacing (Talbot distance $\delta_T$s) can be adjusted, if desired, automatically, to measure different ranges of surface depths and variations.

An apparatus according to the present invention includes a specimen mount which is adapted to receive a specimen having a surface to be measured. Again, a mean surface plane can be defined for the surface. The apparatus also includes a reference grating which is mounted adjacent to the specimen mount and which is positioned to be substantially parallel to the mean surface plane of the specimen when the specimen is received in the specimen mount. The reference grating is movable with respect to the specimen mount so as to vary the Talbot distance $\delta_T$ between the reference grating and the mean surface plane of the specimen. As before, the reference grating has a characteristic pitch.

The apparatus also includes a light source which is mounted so as to direct a beam of light having a given wavelength through the reference grating onto the surface to be measured when the specimen is received in the specimen mount. The beam of light casts a reference grating shadow onto the surface to be measured. The reference grating shadow forms an effective specimen grating on the surface of the specimen.

The apparatus according to the present invention also includes a detector which is positioned to detect moire fringes produced by the reference grating and the effective specimen grating due to variations in depth of the surface to be measured. For both the method, and apparatus of the present invention, the Talbot distance $\delta_T$ is given by the formula:

$$\delta_T = n(2p^2/\lambda),$$

where: n=1, 2, . . . is a positive integer,
  p=pitch of the reference grating, and
  $\lambda$=wavelength of the light.

As for the method, the light source (preferably a point light source) can be a coherent light source such as a laser and the detector can be a camera. In one embodiment, the camera is located at a distance L from the reference grating and at a distance D from the point light source, such that a line passing between the camera and the point light source is substantially parallel to the reference grating. The light source provides the coherent beam of light at a projection angle α with respect to the normal to the grating, while the camera is positioned to detect the moire fringes at a receiving angle β with respect to the normal to the grating at a location with a depth of w. The apparatus can also include a digitizer/detector for digitizing the position and order of the moire fringes and a computer for performing various calculations and compensations. The computer can also be used to control movement of the reference grating in order to adjust the Talbot distance.

The present invention thus provides an apparatus and method for surface measurement which overcomes the disadvantages of prior systems and methods. In particular, the present method and apparatus permit fast and concurrent measurement of a surface, without any dynamic effects or mounting distortion, over the full-field (i.e., whole surface of the wafer), can be automated, and can be applied to other types of surface measurements as well. Enhancement of the shadow moire technique via the Talbot effect permits measurement of very fine surface features typically encountered with substrate wafers for electronic devices.

These and other features and advantages of the present invention will be pointed out in the following specification, taken in connection with the accompanying drawings, and the scope of the invention will be set forth in the appended claims.

DETAILED DESCRIPTION OF THE INVENTION

Figure 1:
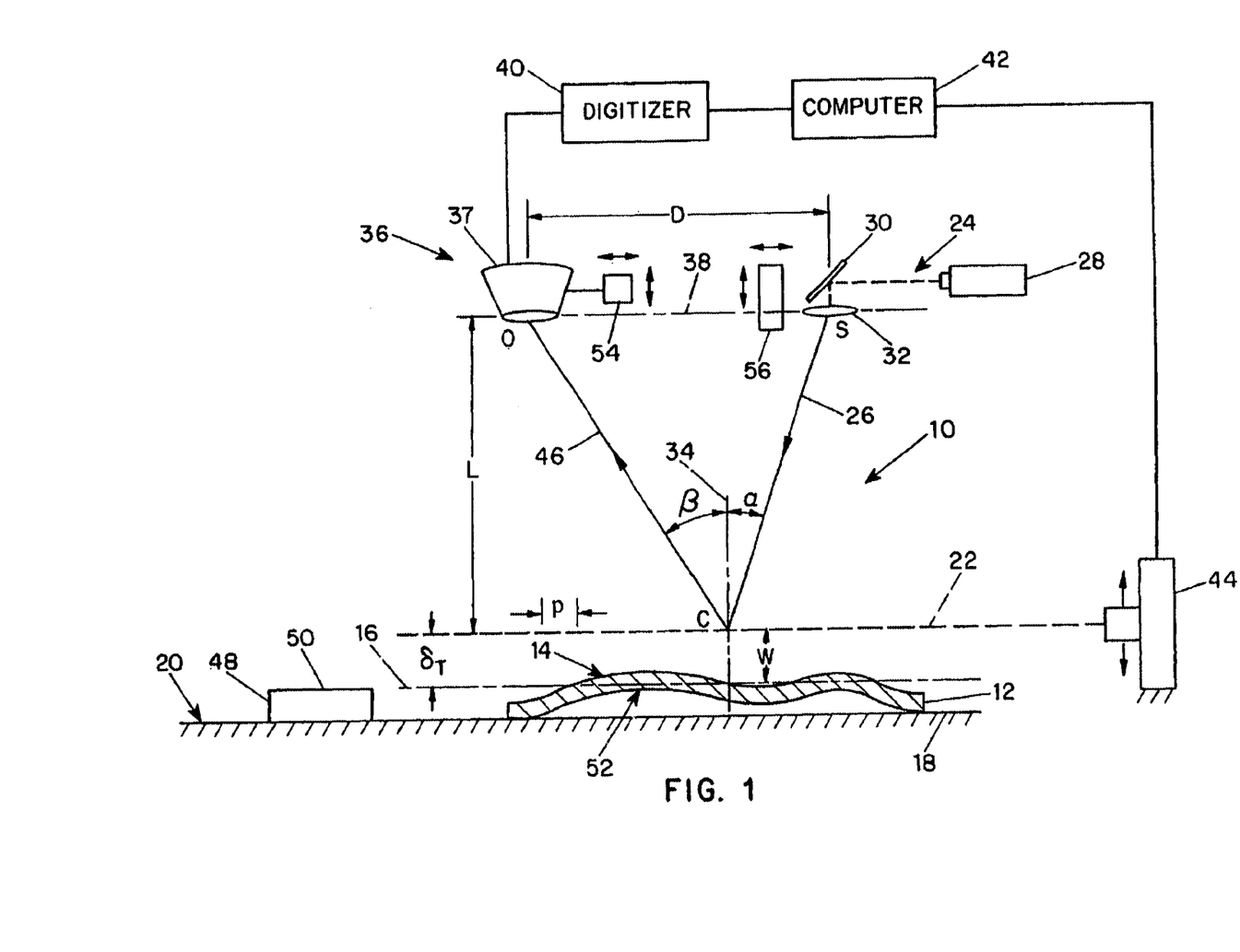
FIG. 1 is a schematic diagram of the present invention.

Reference should now be had to FIG. 1 which depicts an apparatus or surface measurement in accordance with the present invention, designated generally as 10. The apparatus is used to perform surface measurements of a specimen 12 having a surface 14 to be measured. A mean surface plane 16 can be defined for surface 14. Apparatus 10 includes a specimen mount 18 which is adapted to receive specimen 12. The specimen mount can be, for example, simply a specimen plane 20 upon which the specimen 12 is rested Apparatus 10 also includes a reference grating 22 which is mounted adjacent to the specimen mount 18 and which is positioned to be substantially parallel to the mean surface plane 16 of the specimen 12. Of course, this condition occurs when the specimen 12 is received in the specimen mount 18. Reference grating 22 should be movable with respect to specimen mount 18 so as to vary the distance $\delta_T$ between the reference grating 22 and the mean surface plane 16 of the specimen 12. Reference grating 22 has a characteristic pitch p. It is to be understood that either the specimen mount 18 or grating 22 can actually translate to provide the requisite movability.

Apparatus 10 also includes a light source, designated generally as 24, which is mounted to direct a first beam of light 26 through the reference grating 22 and onto the surface to be measured 14. The beam of light 26 has a given wavelength λ. Again, the direction of the light beam 26 just described occurs when the specimen 12 is received in the specimen mount 18. The beam of light 26 casts a first reference grating shadow onto the surface to be measured 14. The first shadow in turn forms a first effective specimen grating. Light source 24 can be a coherent light source, such as that formed by laser 28, mirror 30 and lens 32. In this case, first beam of light 26 is a coherent beam of light. The point light source preferably emits a beam of light such as 26 to cover the entire area of surface 14. Light source 24 can be spaced a distance L from reference grating 22 and can provide the first beam of light 26 at a projection angle α formed with respect to the normal 34 to the reference grating 22 at the location shown in FIG. 1.

Apparatus 10 also includes a detector, designated generally as 36, such as camera 37, which is positioned to detect moire fringes produced by the reference grating 22 and the first effective specimen grating due to, for example, variations in depth of the surface being measured 14. Camera 37 can be a film or electronic camera (such as a CCD camera, digital camera, or similar device; even a single point photodetector device with a suitable X-Y stage and lens could be used) or any other image capturing device; detector 36 can even be simply a human eye and appropriate optical components for viewing the moire pattern instead of camera 37. As discussed below the moire fringes are indicative of a condition of the surface being measured 14; for example, they can indicate the depth of the surface being measured 14 beneath the reference grating 22, and can in turn be used to calculate various parameters associated with the surface, such as the warpage and the total thickness variation. The distance $\delta_T$ is selected to be a Talbot distance given by the formula:

$$\delta_T = n(2p^2/\lambda), \quad (1)$$

where: n=1, 2, . . . is a positive integer, p is the characteristic pitch of the reference grating 22, and λ is the given wavelength of the first beam of light 26.

The invention includes the apparatus 10 without the specimen 12 in place, and can also include the combination of the specimen 12 received into the specimen mount 18 of the apparatus 10. The specimen 12 and surface to be measured 14 typically exhibit a non-flat surface profile, which has been exaggerated for clarity in FIG. 1. The average height of the surface to be measured 14 can be used to define a mean surface plane 16. Surface plane 16 is used to define the Talbot distance $\delta_T$ theoretically. In practice, a precise definition of surface plane 16 is not important, as long as the fringe patterns are clearly visible; the patterns will be clearest when grating 22 is located at distance $\delta_T$ from the surface. Calibration to account for misalignment of grating 22 and specimen mount 18 can be carried out and is discussed below.

The specimen 12 to be measured can be any of a wide variety of items requiring surface measurement. It is believed that the present invention has particular utility in measuring substrate wafers used in microelectronic fabrication, such as silicon and other semiconductor devices.

Detector 36 can be, for example, as noted, a camera 37 and can be located at the distance L from the reference grating 22 and at a distance D from the light source 24. It is to be understood that, throughout this application, when distances are measured relative to the light source 24, they are measured relative to the point where the beam 26 leaves the source 24, for example, the appropriate point in lens 32. When the camera is mounted as discussed, a line 38 passing between the camera and the source of coherent light is substantially parallel to the reference grating 22. Detector 36 such as camera 37 can be positioned to detect the moire fringes at a receiving angle β which is measured with respect to normal 34 to reference grating 22. The condition of the surface to be measured 14 can be determined using the formula:

$$w = NpL/D = Np/(\tan \alpha + \tan \beta), \qquad (2)$$

where: w is depth of the surface to be measured 14 at location C as shown in

FIG. 1 (i.e., w is measured at a point on surface 14 directly below point C),

N is order of a given moire fringe, and $$D \gg Np \text{ is assumed.} \qquad (3)$$

Apparatus 10 can also include a digitizer 40 and a computer 42. Digitizer 40 can be coupled to detector 36 such as a CCD or other electronic camera 37 and digitizes the position and order of the moire fringes, in turn producing a signal characteristic of the position and order of the fringes. Note that a print (even from a film camera) can also be produced and separately scanned to digitize it. It should be appreciated that detector 36 could be a photodetector with an x-y translator controlled by the digitizer. Alternately, if camera 37 is an electronic camera, digitizer 40 can be internal to camera 37. Computer 42 receives the signal from the digitizer 40 and calculates the depths w (typically of the entire surface). When calculating the depth w, computer 42 is also programmed to compensate for any minute angle (misalignment) between the specimen plane 20 and the reference grating 22.

When a photo is digitized, a grid is superimposed onto the photo so that every point in the fringe pattern is assigned X and Y coordinates. The location of all fringes is read. This leads to a series of lines but there is no information between the lines. Although the fringes are gray, it is the middle of the fringe that is detected. Linear interpolation can be carried out between the fringes. For example, every point on a fringe has X and Y coordinates and an associated value of w. Values of w for intermediate points can be determined via two-dimensional linear interpolation, for example. A suitable program for performing the interpolation is Microcal Origin 5.0 available from Microcal Software, Inc., One Roundhouse Plaza, Northampton, Mass. 01060.

It is to be understood that, although plane 20 and grating 22 are nominally substantially parallel to each other, misalignments can occur. A more detailed description of a method of compensating for such misalignments, which can be carried out manually or by computer 42, will be discussed below. Apparatus 10 can also include an interpolator (not separately numbered) which estimates values between the fringes, as discussed above. The interpolator can be, for example, contained within computer 42 as, for example, a software program (including the above Microcal software or any other suitable software).

As noted above, reference grating 22 and specimen mount 18 are movable with respect to each other in order to adjust the distance $\delta_T$. Such movability can be provided by, for example, a translation stage 44 which permits motion of reference grating 22 as suggested by the double-ended arrow. The motion can be controlled by the computer 42, by coupling computer 42 to translation stage 44 using known techniques, such that the Talbot distance $\delta_T$ can be adjusted in order to measure different ranges of surface depths and variations. The Talbot distance δr can be adjusted by computer 42 via feedback based on the moire fringes (e.g., their sharpness and clarity). A user can manually adjust the distance based on visual observations, or the computer can use artificial intelligence or any other suitable scheme to perform the adjustment based on the quality of the moire fringe pattern. To summarize, the Talbot distance $\delta_T$ can be adjusted until the fringes appear suitably sharp, whether to a human operator or an artificial intelligence (or other) program in the computer.

With reference to the foregoing, a method according to the present invention will now be discussed. The method according to the present invention includes the steps of providing a specimen 12 having a surface to be measured 14. A mean surface plane 16 can be defined for surface to be measured 14. The method also includes the step of supporting a reference grating 22 at a distance $\delta_T$ from the mean surface plane 16 and substantially parallel to the mean surface plane 16. The distance $\delta_T$ is, as previously noted, a Talbot distance, and the reference grating 22 has a characteristic pitch p.

The method also includes the step of causing a first beam of light 26 to be directed through the reference grating 22 onto the surface to be measured 14. The first beam of light 26 has a wavelength λ and casts a first reference grating shadow onto the surface to be measured 14. The first reference grating shadow forms a first effective specimen grating.

The method also includes the step of detecting moire fringes produced by the reference grating 22 and the first effective specimen grating due, for example, to variations in depth of the surface to be measured 14. The moire fringes are indicative of a condition of the surface to be measured 14. The Talbot distance $\delta_T$ is given by the formula of equation (1) above in the discussion of the apparatus.

The specimen provided in the first method step can be a substrate wafer for microelectronic fabrication, such as a semiconductor device, as discussed above. In the step of causing the firs beam of light 26 to be directed through the reference grating 22, the first beam of light 26 can be a coherent beam of light, in which case the method can include the additional step of providing a source of light 24 which can be a coherent light source such as that formed by laser 28, mirror 30 and lens 32. The light source 24 can be spaced a distance L from the reference grating 22, as discussed above, and can provide the first coherent beam of light 26 at a projection angle α formed with the normal 34 to the grating 22 at location C, all as set forth above.

The step of detecting the moire fringes can be accomplished with a detector 36, such as camera 37, in which case the method can include the additional step of locating the detector 36, such as camera 37, at the distance L from the reference grating 22 and at the distance D from the light source 24, as set forth above, such that a line 38 passing between the detector 36 and light source 24 is substantially parallel to the reference grating 22. Detector 36, such as camera 37, can be positioned to detect the moire fringes at a receiving angle β measured with respect to normal 34 to reference grating 22. The condition of the surface to be measured in the step of detecting the moire fringes can be determined using the formula for w of equation (2) above.

Figure 7:
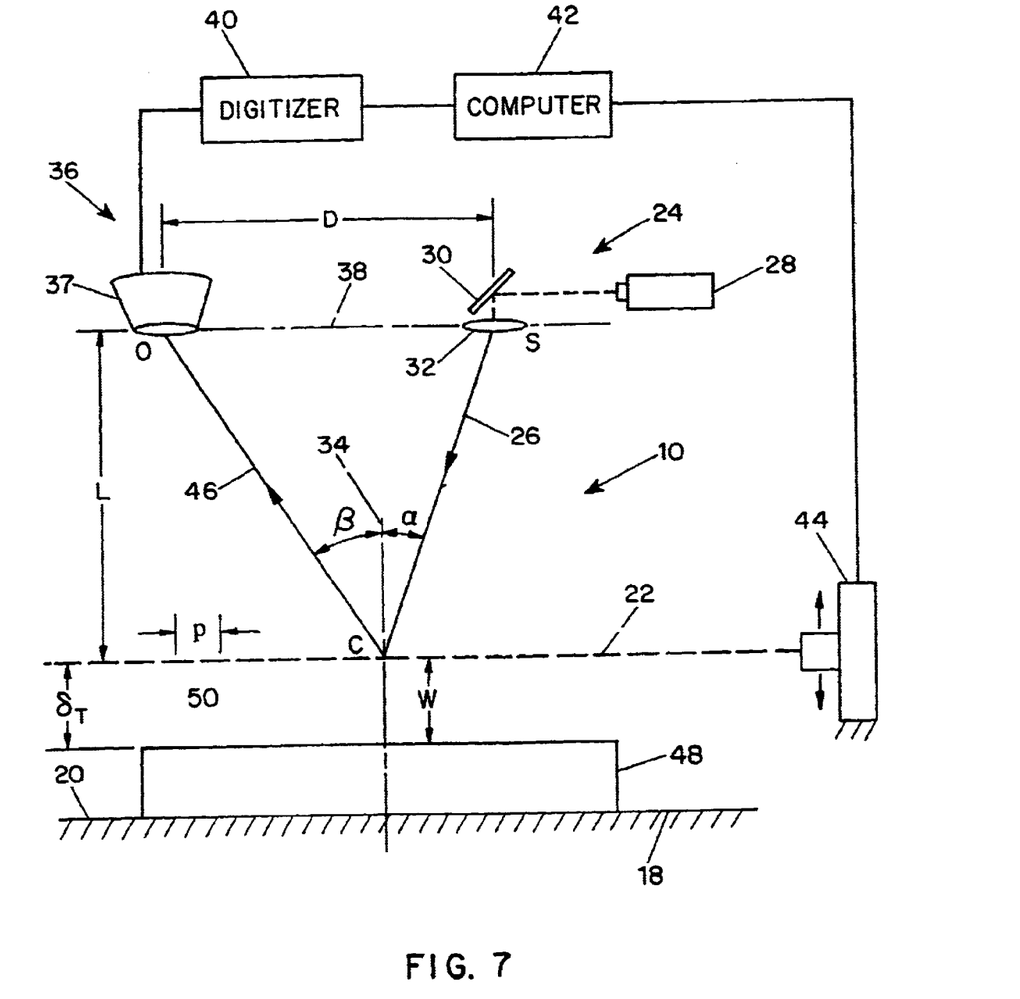
FIG. 7 is a view similar to FIG. 1 depicting calibration of an apparatus according to the present invention.

As noted above, specimen plane 20 and reference grating 22 are positioned to be substantially parallel to each other, so that mean surface plane 16 of specimen 12 will also be substantially parallel to reference grating 22 when specimen 12 is mounted on specimen mount 18. However, there is always the potential for misalignment, i.e., a minute angle between reference grating 22 and specimen plane 20. Accordingly, it is desirable to compensate for the minute angle, or misalignment, in determining the depth w according to the above formula. Reference should now be had to FIG. 7 wherein components or elements similar to those in FIG. 1 have received the same reference numeral or character. For calibration purposes, smooth calibration specimen 48 (normally of substantially uniform thickness) is employed and takes the place of the specimen 12 as shown in FIG. 1. Calibration specimen 48 is also known as a calibration flat. Calibration specimen 48 has a substantially flat surface 50. Moire fringes are formed on the calibration specimen 48, more particularly, on the substantially flat surface 50, just as they are on the actual specimen 12 in FIG. 1. The moire fringes formed as shown in FIG. 7 are indicative of the misalignment, such as a minute angle, between the specimen plane 20 and the reference grating 22. Such misalignment or minute angle should be compensated for in determining the depth w. Accordingly, the method can include the additional steps of providing the specimen plane 20, locating the smooth calibration specimen 48 on the specimen plane 20, viewing the moire fringes as discussed above, and compensating for the minute angle in determining the depth w.

If a calibration flat 48 is placed under the reference grating 22, and the surface 20 is perfectly parallel to the grating 22, then no fringes will be seen. When orientational misalignment exists between the calibration flat 48 and the grating 22, parallel fringes will be seen. In this case, two things can be done:

(1) adjust the grating such that those parallel fringes disappear (thus ensuring that the surface 20 and grating 22 are perfectly parallel); or (2) use the information from the parallel fringes to calculate the orientational misalignment and use the information to compensate for the measurement of surface 14.

Figure 8:
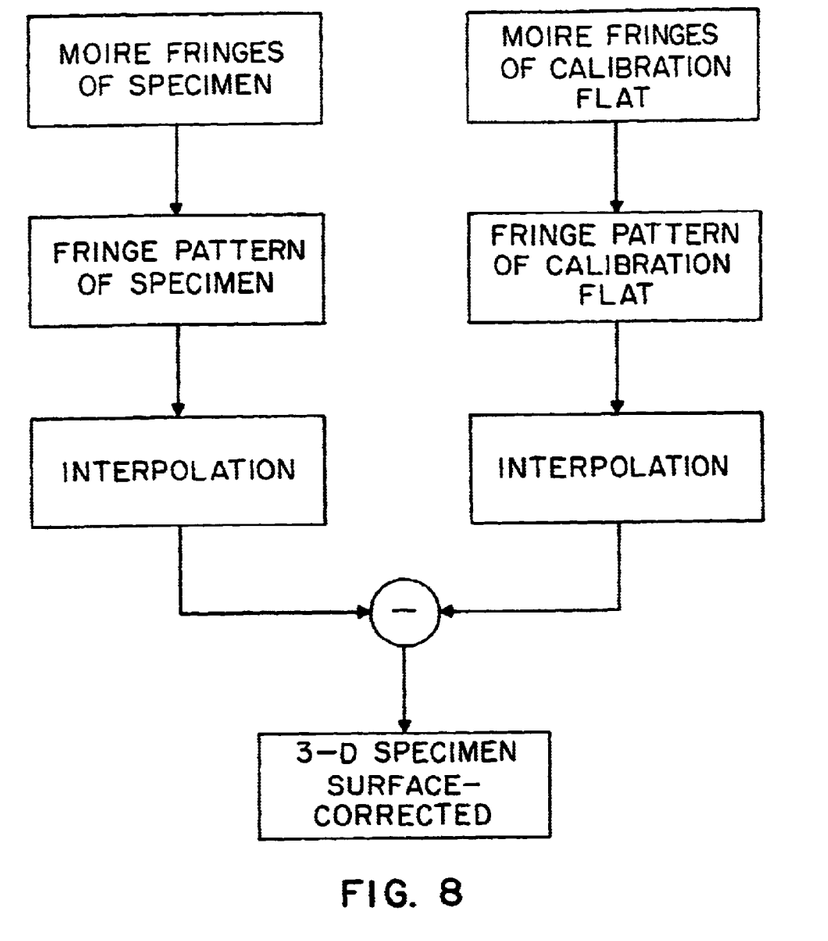
FIG. 8 is a flow chart depicting interpolation and compensation according to the present invention.

It is difficult to achieve "perfect" alignment as in method (1), so therefore it may be preferable to tolerate the misalignment and correct for it. There will be a series of parallel lines on the flat, and they can be used to determine w at two different locations on the flat The difference in w between the two locations can then be divided by the horizontal distance between them to yield the arc tangent of the angle of misalignment. Formula (2) above is used to calculate the w values. This calculation can be performed by hand, or with a simple computer program. Note that calibration specimen 48 can also be located next to the specimen 12, as shown in FIG. 1. FIG. 8 is a flow chart showing the process whereby the fringe pattern of the specimen 12 has the effects due to the misalignment removed by calibration, and is discussed further below.

Referring to the discussion of the digitizer 40 and computer 42 above, the method can include the additional step of digitizing the position and order of the moire fringes with the digitizer 40 and entering the position and order into the computer 42. In this case, calculation of the depth w and compensation for the minute angles, discussed above, in determining w can also be performed by the computer 42. The order of the moire fringes can be determined by arbitrarily assigning an order of, for example, 0 to a reference fringe and then the next adjacent fringe will be 1, the following 2, etc., as is known in the art of moire imaging. The aforementioned linear interpolation can then be conducted between the fringes, if desired.

FIG. 8 shows a flow chart of interpolation and compensation. The actual specimen 12 yields fringe patterns on which interpolation can be performed, as does the calibration flat 48. Errors in alignment detected with the calibration flat are subtracted from the results for the actual specimen to yield the correct three-dimensional specimen surface.

Referring back to FIG. 1, in order to fully measure a specimen 12, such as a semiconductor wafer, the method steps of supporting the reference grating, causing the first beam of light to be directed through the reference grating, and detecting the moire fringes can be repeated for an opposite side surface 52 of specimen 12. A point of known thickness can then be identified for the specimen 12, for example, by using a micrometer or capacitive measuring device (or any other convenient method). The point of known thickness can then be used, in conjunction with data gathered during the repetition of the three steps set forth above, to determine thickness of all points of the specimen 12. The thickness is determined from the measured depth w. This data can then in turn be used to determine at least one of warpage and total thickness variation (TTV) from the thickness of all the points. It will be appreciated that after a first surface 14 of specimen 12 is measured, the specimen can be "flipped" over and second surface 52 can be measured to completely characterize the specimen 12.

As noted above, one advantage of the present invention is the fact that the entire specimen surface 14 or 52 can be measured substantially simultaneously. Thus, with reference to FIGS. 1 and 7, it should be appreciated that first beam of light 26, although shown for illustrative convenience as a single line, can normally be formed so that it illuminates substantially all of the surface to be measured 14. Similarly, detector 36, such as camera 37, can be positioned to detect the moire fringes for substantially all of the surface to be measured 14 substantially simultaneously. Again, return light beam 46, although shown in FIGS. 1 and 7 as a line, would normally have sufficient diameter to encompass the entire surface to be measured 14 of the specimen 12.

It is believed that the speed advantages of the present invention are especially pronounced for wafers with a diameter larger than 200 millimeters (8 inches). The typical thickness of wafers to be measured can range from to 250 microns to 900 microns, although measurements outside this range should also be possible.

The method can include the step of adjusting the pitch p of the reference grating and/or the Talbot distance $\delta_T$ to measure different ranges of surface depths and variations. The adjusting can include varying the Talbot distance $\delta_T$, via feedback based on visibility (or clarity) of the moire fringes. These method steps can be performed using the corresponding structure set forth above, including the translation stage 44. Varying the pitch, p, of the reference grating 22 can change the range of "w"; hence, measuring different ranges of surface depth. However, when p becomes very small (for example, a spatial frequency of about 1000 lines/inch or larger), the diffraction of light passing through the gratings becomes more significant, resulting in unclear fringes. At the Talbot distance, $\delta_T$, the fringes can be seen more clearly (due to optics and signal reconstruction). This is the reason why adjustment for the Talbot distance is carried out.

Figure 9:
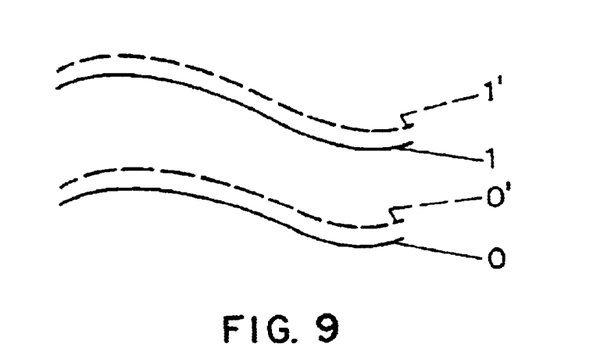
FIG. 9 shows a phase shifting technique of the present invention.

Measurement resolution and sensitivity can be enhanced via phase shifting. It is presently believed that, by use of phase shifting techniques, the resolution or sensitivity can be enhanced by one to two orders of magnitude. In the method of the present invention, phase shifting can be implemented by performing certain additional method steps. These include causing a second beam of light (which can also be represented by beam 26 in FIG. 1) to be directed through the reference grating 22 onto the surface to be measured 14. The second beam of light would normally have the same wavelength $\lambda$ as the first beam of light and would cast a second reference grating shadow onto the surface to be measured 14. The second reference grating shadow would accordingly form a second effective specimen grating. The second beam of light, which, as noted, can be represented by beam 26 in FIG. 1, is phase-shifted with respect to the first beam of light. Any appropriate amount of phase shifting can be used. Phase shifting can be used instead of linear interpolation, and will be more accurate than linear interpolation when surface features change in a non linear fashion. When phase shifting is carried out, a second set of moire fringes are generated with orders 0', 1', etc. It will of course be understood that the phase shifting referred to is with respect to position on the sinusoidal waveform of the light. In the traditional (non-shadow) moire technique, it is known to attain the phase shift by relative motion between the two gratings used in the traditional technique. Since the present invention is concerned with the shadow moire technique, either D or L is changed to obtain a new depth gradation in accordance with formula (2) above. FIG. 9 shows two fringes of a first set of moire fringes of orders 0 and 1 respectively and two fringes of a second set of moire fringes, produced by phase shifting, of orders 0' and 1' respectively.

In old-style non-shadow measurements, it was necessary to rapidly move the gratings so that photos could be taken through them (the moire fringes remained stationary). Preferred gratings for the present invention are formed by etching lines, for example, 1000 to 5000 lines per inch (394–1969 lines per cm) so that a photo can be taken through the grating (or other types of detection can be carried out).

In phase shifting, the change in w between adjacent fringes is known as discussed above. The distance D or L can then be changed (or alternatively, angles $\alpha$ and $\beta$) to get a new value of the change in w between adjacent fringes. This will give different contours—the fringes will move, yielding information about the area between the fringes in the first pattern. For example, the initial change in w between fringes could be 25 $\mu$m and the change after phase shifting could be 20 $\mu$m. The distances D and W could be adjusted, for example, by a computer program. The phase shifting can be carried out with macroscopic changes of the given dimensions (e.g., L and D) and the effective phase seen by the specimen 12 will be changed as set forth above.

The method can then include the additional step of detecting moire fringes produced by the reference grating 22 and the second effective specimen grating due to the aforementioned variations in depth of the surface to be measured 14. The moire fringes are indicative of the condition of the surface to be measured 14. The moire fringes produced by the reference grating 22 and the second effective specimen grating can be employed to determine information about the condition of the surface 14 in between the moire fringes produced during the first measurement.

This can be explained further as follows. In the moire technique, the signal basically consists of a zero or one, i.e., there is either a fringe or a bright band. By shifting the phase of the light beam 26 such that a second light beam with a shifted phase is produced, moire fringes can be produced which will be indicative of the surface condition between the fringes from the first measurement. In the conventional moire technique, which employs two gratings, one grating can be shifted with respect to the other grating; this option is not available when the shadow moire technique is used, inasmuch as the shadow itself forms the reference grating. Accordingly, it is possible in the present invention to shift the phase by changing the distance L or the distance D as depicted in FIG. 1.

In view of the foregoing, it will be appreciated that the apparatus of the present invention can be formed so as to make at least one of the distance L and the distance D adjustable to permit the light source 24, such as the coherent light source formed by laser 28, mirror 30 and lens 32, to produce a second beam of light which is phase-shifted with respect to the first beam of light for purposes of producing the aforementioned additional set of moire fringes. Adjustment of the distances L and D can be carried out using any suitable technique; one possible method would be the use of first and second 2-degree-of-freedom linear stages 54 and 56, respectively, as shown in FIG. 1. First 2-degree-of-freedom linear stage 54 could be secured, for example, to detector 36, such as camera 37. Similarly, second 2-degree-freedom linear stage 56 could be secure for example, to light source 24, such as, more particularly, to lens 32 and mirror 30 (and to laser 28 as desired (not shown)). It will be appreciated that when phase shifting is employed, first (unshifted) and second (shifted) sets of moire fringes are produced, and either or both sets can be stored in the memory of computer 42.

Additional details regarding the moire fringes will now be presented. Moire is a French name for a fabric known as watered silk, which exhibits patterns of light and dark bands. When two gratings of comparable spacing are superimposed, an optical interference pattern is observed. The spacing and orientation of the fringes depends upon the relative pitches (distance between two adjacent lines) and orientation of the individual gratings. The technique discussed herein is the shadow moire method. In the shadow moire method presented herein, the shadow of the reference grating 22 from the beam of light 26 itself serves as the effective specimen grating, as discussed above. When the specimen 12 is undeformed and perfectly parallel to the reference grating 22, no moire fringes will be produced because the reference grating and its shadow are identical. However, when the specimen grating (shadow) is distorted by the variation of the depth of the surface to be measured 14, moire fringes will be created which can be viewed by the eyes or with the aid of detector 36, such as camera 37. The moire fringes contain information on surface topography.

Certain additional information regarding the previously-discussed Talbot distance or Talbot effect will now be presented. The shadow moire method can be used to measure surface topography, as represented by the above-discussed parameter w, ranging from hundreds of millimeters to only a few microns. Since the order of magnitude of the surface features of microelectronic substrate wafers is typically on the order of a few microns, the previously-presented equation (2) for w indicates that a reference grating with a fine pitch will be required to render the required resolution. The pitch might be on the order of, for example, one thousand lines per inch (39 lines/mm). With such a fine pitch for the reference grating 22, diffraction effects become problematic, and as a result, the fringe patterns may be blurred. Therefore, in order to obtain moire fringes with good contrast, the distance between the reference grating 22 and the specimen 12 should be adjusted such that the mean surface plane 16 of the specimen 12 is at a Talbot distance.

The Talbot distance, already discussed with reference to the formula for $\delta_T$ of equation (1) above, is the separation between the grating 22 and its self-image plane. As noted above, resolution in measuring the depth w can be improved by decreasing the pitch p. The Talbot effect can be employed in such cases to render images of the fringes with better contrast, and the Talbot distance $\delta_T$ can, as noted, be adjusted to suit different ranges of surface variations in w. Such adjustment can be carried out, as noted, by employing a feedback technique to vary $\delta_T$ according to the moire fringes. As an alternative, the projection and/or receiving angles $\alpha$ and $\beta$, respectively, as shown in FIGS. 1 and 7 can be increased (equivalent to increasing D and/or decreasing L). However, there are limits to such increase as this may cause the size of the equipment to become too large to be practical.

The spatial frequency of the moire fringes represents the variation in depth. Very densely populated regions are associated with a steep rise or fall on the surface of the specimen. Accordingly, it is possible to effectively detect the condition of the specimens without detailed three dimensional surface analysis using the whole-wafer full-field fringe information. Rejection of wafers can readily be made based upon abnormal distribution of fringes, without an expensive computation cost. It will be apparent that the specimens need not be moved during the measuring process, thus eliminating distorting effects present in prior techniques (i.e., dynamic stress, vibration or distortion due to suction and spinning of wafers). Further, the present apparatus and method can be used regardless of the shape and size of the specimens; the specimens can be, for example, rectangular, round, or in a torus shape. It is possible to design the apparatus such that one device can fit all desired specimens. Prior capacitive probe devices have normally been limited to round wafers. Best results with the present method are obtained when a good shadow of the reference grating 22 can be created, i.e., when the surface to be measured is not too rough or too reflective. Further, it has been found desirable to keep surface 14 clean and free of fingerprints.

It should be noted that the shadow moire method presented herein is not limited to detection of variations in depth, and is also quite effective in depicting surface abnormalities caused by excessive residual stresses, cracks and dislocations arising during the manufacturing process. The residual stresses can be measured by detection of the difference in w between pre-annealed and post-annealed wafer surfaces, using the same techniques presented above. Strain is measured with the present invention and can be translated to stress knowing the elastic properties of the wafer material.

It should be understood that explicit calculation of w with Equation (2) need not necessarily be carried out in the present apparatus and method. For example, a general fringe pattern inspection can be made to detect drastic changes in surface topology. Artificial intelligence can be used to examine the fringe patterns for drastic changes as well; the increased speed permits 100 % inspection for quality assurance.

Note also that adjustment of resolution in detecting surface features can be made by on-line changes of grating 22 to different spatial frequencies. For example, suppose a specimen is relatively flat in one location and curved elsewhere. A 1000 line per inch grating might be good for viewing the curves, but would not have enough resolution to detect roughness in the flat part. A 5000 line per inch grating might reveal the roughness, but produce too-closely-spaced fringes on the curved region.

EXAMPLE 1

Figure 2:
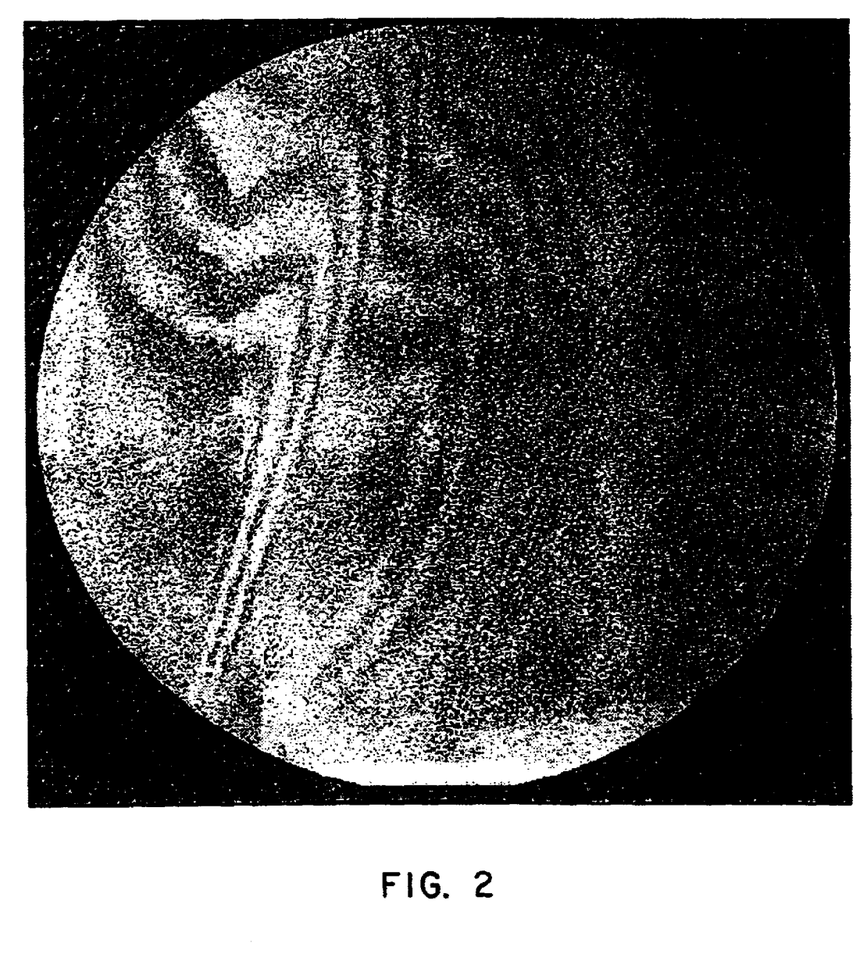
FIG. 2 shows moire fringes on the surface of a 200 mm diameter single crystal silicon wafer generated by an apparatus according to the present invention.

Shadow moire fringes were obtained on the surface of a 200 mm diameter single crystalline wafer. The wafer was round and had an orientation flat. With reference to FIG. 2, the orientation flat is located horizontally at the bottom of the figure. The fringes are the depth contours of the wafer surface as represented by the equation for w set forth in equation (2) above. The Talbot distance is approximately two millimeters, the distance D was 209 cm, the distance L was 140 cm, and the light source was a helium neon laser with a wavelength of $\lambda$=630 nm. The single crystalline wafer was a semiconductor wafer. The reference grating 22 had a spatial frequency of 1,000 lines per inch (39 lines per mm). With the parameters of the experimental setup and the foregoing equation (2) for w, the difference in depth $\Delta w$ between any two neighboring fringes was calculated as 17 microns. By substituting the fringe order, N, into the equation (2) for w, it is possible to obtain the depth, w, for each point on the wafer surface. The depth is compensated for the angle between the plane of the reference grating 22 and the specimen plane 20, as set forth above, using an optical flat as a calibration specimen. Fringe order and orientation on the smooth calibration specimen 48 were used for adjusting the depth w calculated on the actual specimen, namely, the single crystalline semiconductor wafer. With reference to FIG. 2, there is a steep change of surface depth along the densely populated fringes across the right hand side wafer surface. This is due to high residual stress on the wafer from either crystal growth or the wafer slicing process. The moire fringes which are depicted were made with black and white photos taken with a camera. The residual stress depicted in FIG. 2 can cause the wafer to be easily buckled in either direction. In fact, the buckling was so pronounced on the sample that it was not possible to gather alternative data using a profilometer because of the sensitivity to contact pressure. Furthermore, dynamic/inertia forces, such as those arising from spinning the wafers in prior techniques, would also result in a loss of fidelity in measurement. The sparse fringes on the left side of the wafer surface indicate that the surface variation there is more gradual.

Figure 4:
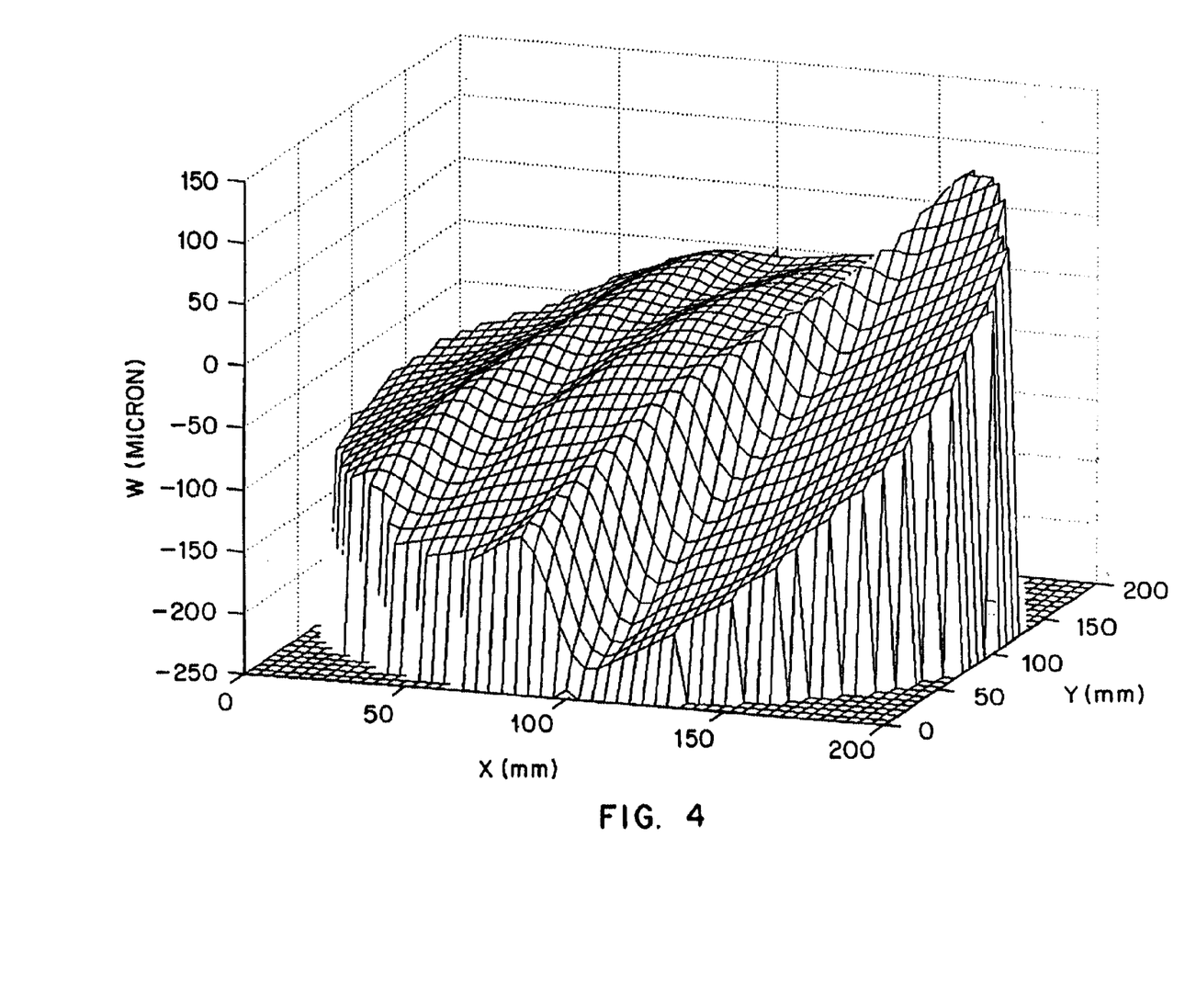
FIG. 4 shows a three-dimensional topography plot of the 200 mm diameter wafer surface of FIG. 2 generated with the present invention.
Figure 5:
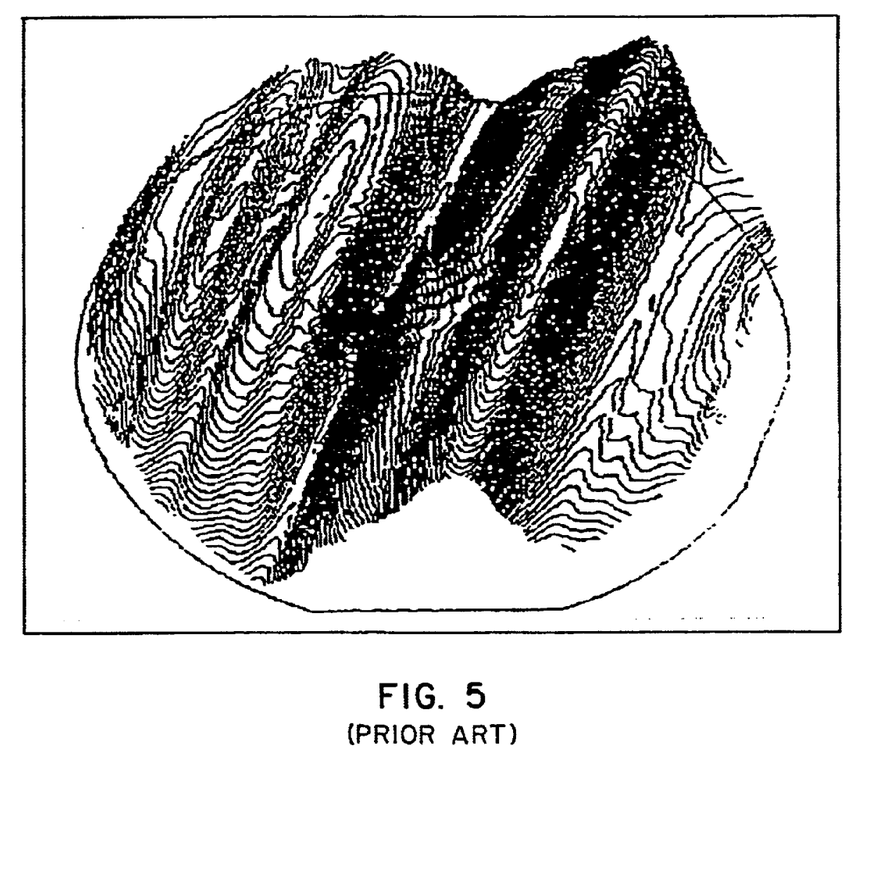
FIG. 5 shows a three-dimensional contour plot of the 200 mm diameter wafer surface generated with a prior art device.

Using a digitizing process and a computer, as described above, with calibration from a calibration specimen 48 as set forth above, the results were employed to draw the three-dimensional topography diagram of the wafer surface as shown in FIG. 4. In the figure, a drastic change in surface depth of the wafer surface is depicted which corresponds to the densely populated fringes of FIG. 2. The reference plane at w=−250 microns is chosen arbitrarily to show the relative height of the surface topography. X and Y represent coordinates in the plan view. FIG. 5 shows a surface contour plot obtained with a prior device, namely, an ADE UltraGage 9500 desk top measuring device. The measurements with the prior device were made on a sliced wafer from the same ingot. The results of the measurements from both methods are comparable. Both show the steep change in surface at the same location. However, the moire fringes show the surface irregularities with a higher resolution, as plotted in the 3-D surface of FIG. 4. The contour plot of FIG. 5 shows two peaks at the left half of the surface which is consistent with the three dimensional plot of FIG. 4.

EXAMPLE 2

Figure 3:
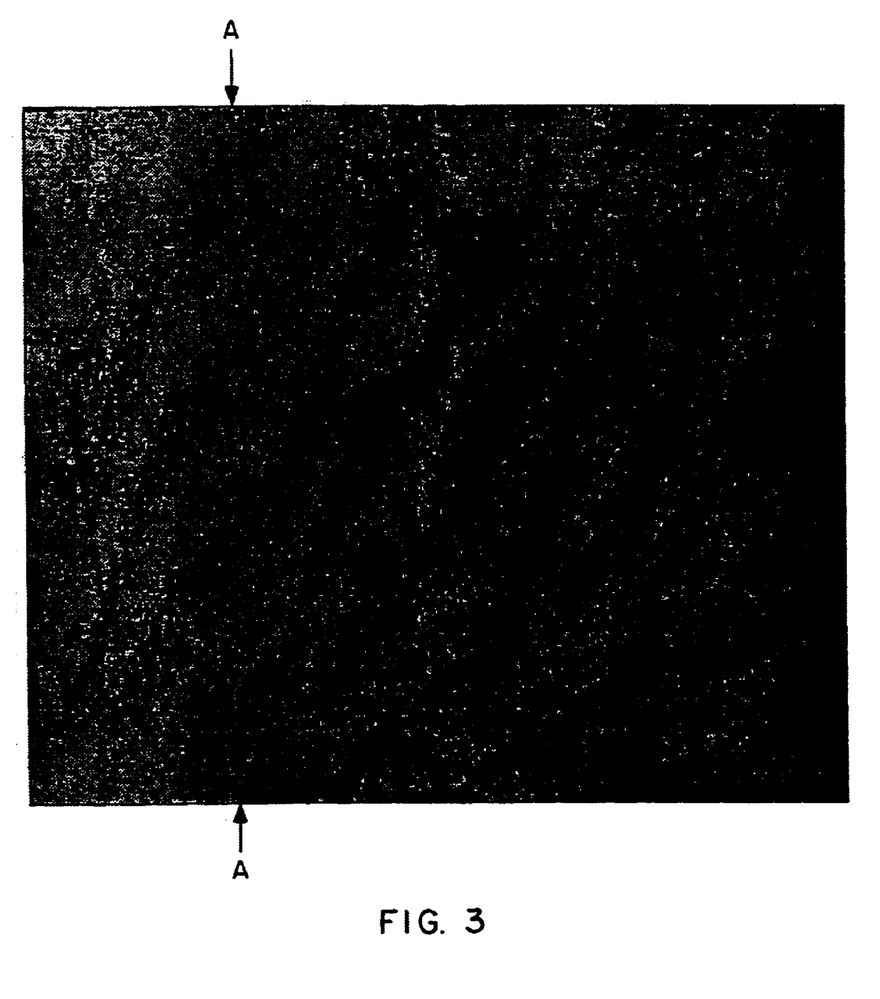
FIG. 3 shows moire fringes on the surface of a 100 mm×90 mm polycrystalline photovoltaic wafer generated with an apparatus according to the present invention.
Figure 6:
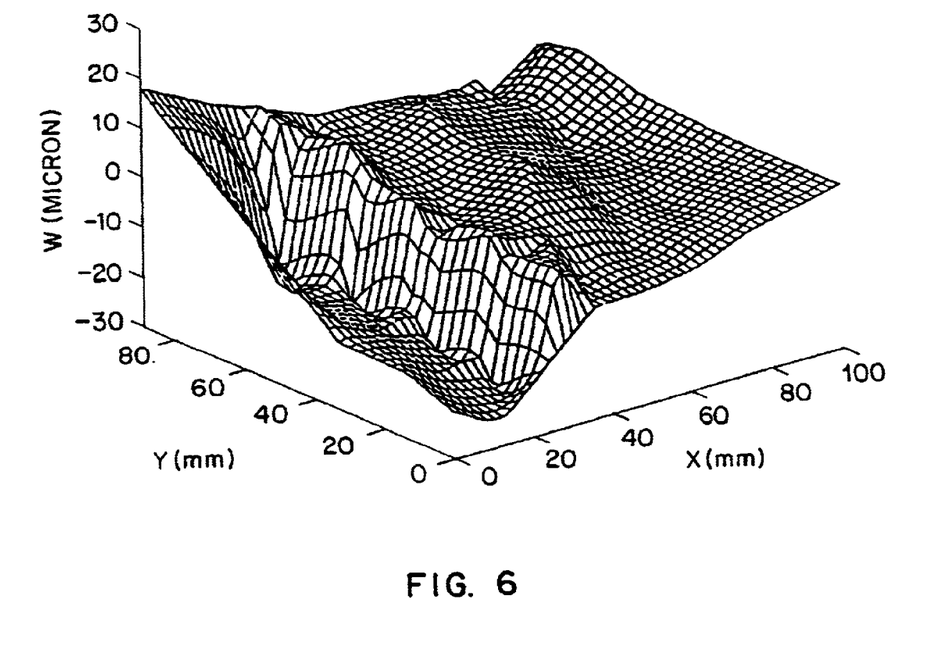
FIG. 6 shows a three-dimensional topography plot of the 100 mm×90 mm wafer surface of FIG. 3 generated with the present invention.

Experimental measurements were conducted on a 100 by 90 millimeter polycrystalline substrate wafer as shown in FIG. 3. The test setup and parameters were otherwise identical to that for FIG. 2. The wafer for this example was sliced by an HCT wiresaw. During the slicing process, change of wire took place due to wire rupture. As a result, there was a visible pause line on the wafer surface, about 25 millimeters from the left edge. The moire fringes in FIG. 3 successfully capture the pause caused by the manufacturing process. The three dimensional surface topography is shown in FIG. 6, obtained by the same process of digitizing as for the wafer in Example 1. From the fringe pattern in FIG. 3 and the three dimensional topography in FIG. 6, it is found that the surface jump occurs at x≅25 millimeters with a depth jump of Δw ≅17 microns, which corresponds to the difference of one fringe order. By measuring the actual wafer, the change in depth was found at x=25 millimeters (i.e., the pause line) and the maximum variation of the height over the entire wafer surface was Δw=25 microns. This is consistent with the data obtained by surface measurements. The pause line is indicated in FIG. 3 as the opposed arrowheads A—A.

EXAMPLE 3

Preliminary investigations have been performed with a 5000 line per inch grating. Visual observation has been carried out, but no images have been prepared. While diffraction makes it more difficult to capture images, basic patterns are discernible.

Although the present invention has been described with reference to specific exemplary embodiments, it should be understood that various changes, substitutions and alterations can be made to the disclosed embodiments without departing from the spirit and scope of the invention as defined by the appended, claims.

What is claimed is:

1. A method for surface measurement comprising the steps of:
   (a) providing a specimen having a surface to be measured, said surface having a mean surface plane defined therefor;
   (b) supporting a reference grating at a distance $\delta_T$ from said mean surface plane and substantially parallel to said mean surface plane, said distance $\delta_T$ being a Talbot distance, said reference grating having a pitch;
   (c) causing a first beam of light to be directed through said reference grating onto said surface to be measured, said first beam of light having a wavelength λ and casting a first reference grating shadow onto said surface to be measured, said first reference grating shadow forming a first effective specimen grating; and
   (d) detecting moire fringes produced by said reference grating and said first effective specimen grating due to variations in depth of said surface to be measured, said moire fringes being indicative of a condition of said surface to be measured;

wherein, in step (b), said Talbot distance $\delta_T$ is given by the formula:

$$\delta_T = n(2p^2/\lambda)$$

where: n=1, 2, . . . is a positive integer,
   p is said pitch of said reference grating, and
   λ is said given wavelength of said first beam of light.

2. The method of claim 1, wherein step (a) comprises providing a substrate wafer as said specimen.

3. The method of claim 2, wherein in step (c), said first beam of light is coherent, further comprising the additional step of providing a source of coherent light which is spaced at a distance L from said reference grating and which provides said coherent beam of light at a projection angle a formed with a normal to said grating.

4. The method of claim 3, wherein in step (d), said detecting of said moire fringes is accomplished with an electronic camera, further comprising the additional step of locating said electronic camera at said distance L from said reference grating and at a distance D from said source of coherent light such that a line passing between said electronic camera and said source of coherent light is substantially parallel to said reference grating, said electronic camera being positioned to detect said moire fringes at a receiving angle β with respect to said normal to said grating, and wherein in step (d) said condition of said surface to be measured is determined using the formula:

$$w = NpL/D = Np/(\tan \alpha + \tan \beta)$$

where: w is said depth of said surface to be measured,
N is order of a given one of said moire fringes, and
D>>Np.

5. The method of claim 4, further comprising the additional steps of:
   providing a specimen plane on which said electronic wafer rests, said specimen plane being substantially parallel to said reference grating;
   locating a smooth calibration specimen of substantially uniform thickness on said specimen plane;
   viewing moire fringes formed on said smooth calibration specimen to detect any angle between said specimen plane and said reference grating; and
   compensating for said angle in determining said depth w.

6. The method of claim 5, further comprising the additional step of digitizing position and order of said moire fringes and entering said position and order into a computer, wherein calculation of said depth w and compensation for said angle in determining w are also performed by said computer.

7. The method of claim 6, wherein said order of said moire fringes is determined using an interpolation method.

8. The method of claim 6, further comprising the additional steps of:
   (e) repeating steps (b) through (d) for an opposite side surface of said specimen;
   (f) identifying a point of known thickness for said specimen;
   (g) using steps (e) and (f) to determine thickness of all points of said specimen from said depth w; and
   (h) determining at least one of warpage and thickness variation from said thickness of all said points.

9. The method of claim 2, wherein:
   step (c) includes causing said first beam of light to illuminate substantially all of said surface to be measured; and
   step (d) includes detecting said moire fringes for substantially all of said surface to be measured substantially simultaneously.

10. The method of claim 9, wherein in step (d) said detecting is carried out with a camera.

11. The method of claim 9 wherein in step (d) said detecting is carried out by visual observation.

12. The method of claim 2, further comprising the additional step of adjusting said Talbot distance $\delta_T$ to measure different ranges of surface depths and variations.

13. The method of claim 12, wherein said adjusting includes varying said Talbot distance $\delta_T$ via feedback based said moire fringes.

14. The method of claim 2, further comprising the additional steps of:

causing a second beam of light to be directed through said reference grating onto said surface to be measured, said second beam of light having said wavelength $\lambda$ and casting a second reference grating shadow onto said surface to be measured, said second reference grating shadow forming a second effective specimen grating, said second beam of light being phase-shifted with respect to said first beam of light;

detecting moire fringes produced by said reference grating and said second effective specimen grating due to said variation in depth of said surface to be measured, said moire fringes being indicative of said condition of said surface to be measured; and using said moire fringes produced by said reference grating and said second effective specimen grating to determine information about said condition of said surface in between said moire fringes detected in step (d).

15. An apparatus for surface measurement of a specimen having a surface to be measured, the surface having by a mean surface plane defined therefor, said apparatus comprising:

(a) a specimen mount which is adapted to receive the specimen;

(b) a reference grating which is mounted adjacent said specimen mount and which is positioned to be substantially parallel to the mean surface plane of the specimen when the specimen is received in said specimen mount, said reference grating and said specimen mount being movable with respect to each other so as to vary a distance $\delta_T$ between said reference grating and the mean surface plane of the specimen, said reference grating having a pitch;

(c) a light source which is mounted to direct a first beam of light having a given wavelength through said reference grating onto the surface to be measured when the specimen is received in said specimen mount, said first beam of light casting a first reference grating shadow onto the surface to be measured, said first reference grating shadow forming a first effective specimen grating; and (d) a detector which is positioned to detect moire fringes produced by said reference grating and said first effective specimen grating due to variation in depth of the surface to be measured, said moire fringes being indicative of a condition of the surface to be measured, wherein said distance $\delta_T$ is selected to be a Talbot distance given by the formula:

$$\delta_T = n(2p^2/\lambda)$$

where: n=1, 2, . . . is a positive integer, p is said pitch of said reference grating, and $\lambda$ is said given wavelength of said first beam of light.

16. The apparatus of claim 15, further comprising a specimen having a surface to be measured which is received in said specimen mount, said surface to be measured having a mean surface plane defined therefor.

17. The apparatus of claim 16, wherein said specimen is a substrate wafer to be used for fabrication of microelectronic devices and said specimen mount includes a specimen plane which is substantially parallel to said reference grating.

18. The apparatus of claim 17, wherein:

said light source is a coherent light source and said first beam of light is a coherent beam of light; and said light source is spaced a distance L from said reference grating and provides said first coherent beam of light at a projection angle $\alpha$ formed with respect to a normal to said grating.

19. The apparatus of claim 18, wherein:

said detector is a camera;

said camera is located at said distance L from said reference grating and a distance D from said source of coherent light such that a line passing between said camera and said source of coherent light is substantially parallel to said reference grating;

said camera is positioned to detect said moire fringes at a receiving angle $\beta$ formed with said normal to said grating; and said condition of said surface to be measured is determined using the formula:

$$w = NpL/D = Np/(\tan \alpha + \tan \beta)$$

where: w is said depth of said surface to be measured,

N is order of a given one of said moire fringes, and

D>>Np.

20. The apparatus of claim 19, further comprising:

a digitizer which digitizes position and order of said moire fringes and which produces a signal characteristic of said position and order; and a computer which receives said signal from said digitizer and calculates said depth w, and which compensates for angles between said specimen plane and said reference grating in determining w.

21. The apparatus of claim 20, further comprising:

an interpolator which determines said order of said moire fringes using an interpolation method.

22. The apparatus of claim 21, wherein said computer is configured to control movement of said reference grating with respect to said specimen mount, so as to adjust said Talbot distance $\delta_T$ to measure different ranges of surface depths and variations.

23. The apparatus of claim 22, wherein said Talbot distance $\delta_T$ is adjusted by said computer via feedback based on said moire fringes.

24. The apparatus of claim 19, wherein at least one of said distance L and said distance D is adjustable to permit said light source to produce a second beam of light which is phase-shifted with respect to said first beam of light for purposes of producing an additional set of said moire fringes which reveal additional information about said surface to be measured.

* * * * *